United States Patent
Song et al.

(10) Patent No.: US 6,519,213 B1
(45) Date of Patent: Feb. 11, 2003

(54) METHOD AND APPARATUS FOR READING DATA FROM A DISK

(75) Inventors: Hubert Song, Sunnyvale, CA (US); Hwee Chin Ong, Sunnyvale, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/343,115

(22) Filed: Jun. 29, 1999

(51) Int. Cl.$^7$ ............................................. G11B 7/095
(52) U.S. Cl. ........................... 369/44.26; 369/44.28; 369/44.29; 369/53.22
(58) Field of Search ..................... 369/13.38, 14, 369/44.26, 44.25, 44.29, 44.35–44.36, 52.1, 53.2, 53.22–53.23, 53.35, 44.28

(56) References Cited

U.S. PATENT DOCUMENTS

| | | | |
|---|---|---|---|
| 4,787,076 A | * 11/1988 | Deguchi et al. | |
| 5,155,716 A | * 10/1992 | Imanaka et al. | 369/44.32 |
| 5,220,546 A | 6/1993 | Fennema | |
| 5,535,327 A | 7/1996 | Verinsky et al. | 395/182.03 |
| 5,581,715 A | 12/1996 | Verinsky et al. | 395/309 |
| 5,870,363 A | 2/1999 | Sun et al. | |
| 5,878,020 A | 3/1999 | Takahashi | 369/275.3 |
| 5,926,445 A | * 7/1999 | Sasaki et al. | 369/44.25 |
| 6,034,934 A | * 3/2000 | Miyake et al. | |
| 6,034,937 A | * 3/2000 | Kumagai | |
| 6,052,465 A | * 4/2000 | Gotoh et al. | |
| 6,233,207 B1 | * 5/2001 | Tanaka | 369/44.26 |
| 6,266,299 B1 | * 7/2001 | Oshima et al. | |

OTHER PUBLICATIONS

"PDSC–Replication and BCA", pp. 1–2 (May 5, 1999).
"The Compact Disk Handbook", 2$^{nd}$ edition, by Ken C. Pohlmann, pp. 86–89 (1992).
"Philips Consumer Electronics—Compact Disk: *Nothing is Impossible*", pp. 1–26 (May 12, 1999).
"Compact Disc Pickup Designs", by Cho Leung Chan, pp. 1–6 (May 12, 1999).
"GIF Image 669×459 pixels", (May 12, 1999).
"OTI–9780: *Preliminary Product Brief*", pp. 1–2 (7/98).
"OTI–9780 Product Brief: *Technical Specifications*", pp. 1–2 (Mar. 12, 1999).
"OTI–975: *IDE CD Recordable/ReWritable Controller*", pp. 1–2 (Mar. 12, 1999).
"GIF Image", (Mar. 12, 1999).
"OTI–912: *IDE CD–ROM Controller*", pp. 1–2 (3/97).
"CD—*The Inside Story*", by Glen Baddleley, (Jul. 1, 1998).
"CD—*The Inside Story—Part 1—General Principles*", by Glenn Baddeley, (Dec. 2, 1996).
"CD—*The Inside Story—Part 2—The Disc*", by Glenn Baddeley, (Dec. 2, 1996).
"CD—*The Inside Story—Part 3—Data Format*", by Glenn Baddeley, pp. 1–2 (Dec. 2, 1996).
"CD—*The Inside Story—Part 4—Sub–code*", by Glenn Baddeley, pp. 1–2 (Dec. 2, 1996).

(List continued on next page.)

*Primary Examiner*—W. R. Young
(74) *Attorney, Agent, or Firm*—Pennie & Edmonds LLP (57) ABSTRACT

A method and apparatus provide positive lens position control when reading information from a disk storing data using a first and a second encoding format. When reading the data encoded in the second encoding format, the lens is maintained in a substantially stationary radial position with respect to the disk. When the data encoded in the second encoding format has an error, the lens position is changed to find a better position for reading the data.

16 Claims, 8 Drawing Sheets

OTHER PUBLICATIONS

"CD—The Inside Story—Part 5—Laser Tracking", by Glenn Baddeley, pp. 1–4 (Dec. 2, 1996).

"CD—The Inside Story—Part 7—Digital to Analog Conversion", by Glenn Baddeley, pp. 1–4 (Dec. 2, 1996).

"CD—The Inside Story—Part 8—Over-sampling and Filtering", by Glenn Baddeley, pp. 1–4 (Dec. 2, 1996).

"CD—The Inside Story—Part 9—Mythology", by Glenn Baddeley, pp. 1–2 (Dec. 2, 1996).

"CD—The Inside Story—Postscript & References", by Glenn Baddeley, pp. 1–2 (Feb. 13, 1998).

"Audio Compact Disk—An Introduction", by Professor Kelin J. Kuhn, pp. 1–7 (May 12, 1999).

"Mitsubishi <Control/Driver IC> M56755FP Spindle Motor Driver", pp. 1–9.

"Mitsubishi <Control/Driver IC> M56754P 4-Channel Actuator Motor Driver", pp. 1–7.

*Runout Calibration for Disc Drive System*, U.S. patent application Ser. No. 08/834,607, (Filed Apr. 14, 1997).

* cited by examiner

FIG. 1

Block Diagram of Disk Drive System

FIG. 2

Sled Carriage

Block Diagram of a Disk Drive System

Low Frequency Filter

FIG. 9

Loop Equalizer

METHOD AND APPARATUS FOR READING DATA FROM A DISK

BRIEF DESCRIPTION OF THE INVENTION

This invention relates generally to optical recording. More particularly, this invention relates to a method and apparatus for reading optically encoded data from a disk.

BACKGROUND OF THE INVENTION

Personal computers typically connect to an optical disk drive such as a CD-ROM to read data from a compact disk. On the compact disk, data is stored in the form of pits and lands patterned in a radial track. The track is formed in one spiral line extending from the inner radius of the disk to the outer edge. A pit is a location on the disk where data has been recorded by creating a depression in the surface of the disk with respect to the lands. The lands are the areas between the pits in the tangential direction. The reflectivity of the pits is less than the reflectivity of the lands. To store audio or digital information, the length of the pits and lands are controlled according to a predefined encoding format.

When reading information from the disc, light from a laser beam is directed onto the track and the light beam is reflected back to a photo-sensor, such as a photo-diode. Since the pits and lands have different reflectivity, the amount of reflected light changes at the transitions between the pits and the lands. In other words, the encoded pattern of the pits and lands modulates the reflected light beam. The photo-sensor receives the reflected light beam, and outputs a modulated signal, typically referred to as an RF signal, that is proportional to the energy of the light in the reflected light beam.

Figure 1:
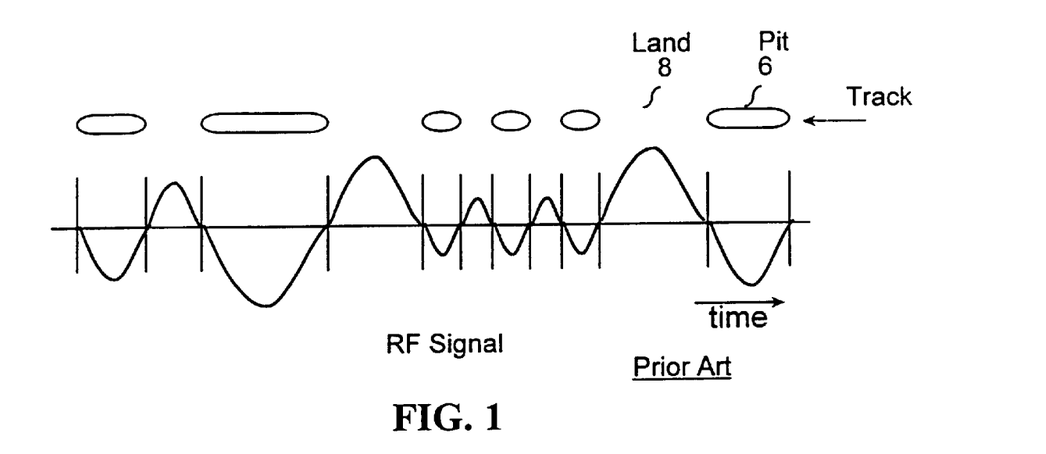
FIG. 1 illustrates the relationship between an analog RF signal and the pits and lands on a disk.

In FIG. 1, the relationship of the RF signal to the pits and lands is shown. A smaller pit or land decreases both the period and the amplitude of the RF signal. The RF signal has opposite polarity in the pits and lands.

One encoding format used in optical disk systems is eight-to-fourteen modulation (EFM). EFM reduces errors by minimizing the number of zero-to-one and one-to-zero transitions. In other words, small pits are avoided. In EFM, the data signal includes no less than two zeros and no more than ten zeros between logical transitions at the pit edges. A zero is indicated by no change in the energy reflected beam for at least two clock periods. A one is indicated by a change in the energy of the reflected light beam, that is, a pit edge. Applying the EFM encoding rules, a pit or land will have a length corresponding to the amount of time for at least two, and up to ten, clock periods and the electronics will output a corresponding voltage as shown in FIG. 1.

In an optical disk drive, an optical head assembly includes the photo-sensor, a tracking actuator and a lens. The photo-sensor is mounted on a sled. The lens is mounted on the tracking actuator which is mounted on the sled. The lens is positioned between the photo-sensor and the disk to transmit the light beam from the laser onto the disk surface and to transmit the reflected light beam to the photo-sensor. The sled and tracking actuator position the photo-sensor and lens with respect to the spiral track. The sled is driven by a sled motor that positions the optical head assembly radially across the disk. The tracking actuator is a voice coil motor that positions the lens within the limits of the sled. Because the geometry of the photo-sensor is large with respect to a single track, the lens can be positioned within a range of tracks and the photo-sensor can properly detect the RF signal.

Information is written on predetermined regions of the track and the lens is positioned over a target region of the track. The spiral track is written within a main storage area of the disk. The DVD disks store any one or a combination of video, audio and data signals in the main storage area.

A search is performed to position the optical head assembly over a target region of the spiral track. During searching, track crossings will be detected as the lens moves radially across the spiral track thereby providing position information in terms of a number of "tracks" crossed with respect to a given position on the disk. During rough searches, the prime mover of the optical head assembly is the sled motor. On fine searches, the prime mover of the lens is the tracking actuator.

DVD disks have another area, within the disk hub, in which a bar code is written to store disk identification information. This area is referred to as the burst cutting area (BCA). The burst cutting area is part of the DVD standard. The bar code stored in the burst cutting area is referred to as a BCA code. In the burst cutting area, the BCA code is recorded in a lead-in area near the inner ring of the disk. The BCA code is not recorded in the main storage area. The BCA code stores from twelve to 188 bytes in sixteen-byte increments and allows serial numbers to be associated with disks. The BCA code also aids in piracy protection because it can include an encryption/decryption key, thereby making BCA code suitable for use with the Internet. Using the encryption/decryption key, a disk having multiple programs can be customized for partial sale. In a partial sale of a disk storing a set programs, the purchaser pays for a subset of the programs on the disk. The purchaser is provided with appropriate decryption keys that allows the purchaser to play the subset of programs for which they paid. To read the BCA code, the prime mover of the sled is pushed against an inner stop and the secondary lens positioning tracking actuator runs freely within the carriage while reading the BCA code.

To keep the lens properly positioned over the spiral track in the main storage area, the electronics generates a track error signal from the light received by the photo-sensor that is reflected from the spiral track. The photo-sensor has a size and position that is a function of the ideal center position of the lens with respect to the spiral track.

In the burst cutting area, there is no track error signal to control the positioning of the tracking actuator with respect to the sled. One method samples a track error signal when positioned over the spiral track, and uses the sampled track error signal to position the lens in the burst cutting area while reading the BCA code. A sample-and-hold circuit maintains the sampled track error signal, thereby treating the burst cutting area as a large defect area.

On a DVD disk, the track pitch of the spiral track in the main storage area is 0.00074 millimeter (mm) while the width of the burst cutting area is 1.15 mm. This difference in track width increases the difficulty of controlling the lens position in the burst cutting area because no meaningful track error signal can be generated. In addition, because the burst cutting area is very wide as compared to the track width of the spiral track, some drives position the lens by moving the sled via a rough search operation. Since no track error signal is present in the burst cutting area, it is difficult to precisely determine the sled position with respect to the burst cutting area.

Reading the BCA code without precise control of the lens position is not reliable. Disk drives may have marginal tolerances with respect to the innermost lens position and repositioning the lens may be desirable. For example if the lens is positioned at the edge and not completely over the burst cutting area, errors may result when reading the BCA code. In addition, if the lens is positioned on the edge of the burst cutting area, disc run-out may cause errors thereby degrading the readability of the BCA code. The burst cutting area may also have defects that produce errors when reading the BCA code.

In view of the foregoing, it would be highly desirable to provide a method and apparatus to improve the readability of the BCA code.

SUMMARY OF THE INVENTION

A method and apparatus provide positive lens position control when reading information from a disk that stores data using a first and a second encoding format. When reading the data encoded in the second encoding format, the lens is maintained in a substantially stationary radial position with respect to the disk. When the data encoded in the second encoding format has an error, the lens position is changed to find a better position for reading the data.

In particular, positive lens position control is provided when reading BCA code on DVD discs. When reading the BCA code, the lens is maintained in a substantially stationary radial position with respect to the disk. When the BCA code has an error, the lens position is changed to find a better position from which to read the BCA code.

A method includes reading information recorded on a disk having first and second encoded data areas. The second encoded data area uses a different encoding format from the first encoded data area. A second encoded data area position signal is generated based on a track centerline signal and a second encoded data area position reference signal. The second encoded data area position signal drives a tracking actuator.

In another aspect of the invention, a circuit reads information recorded on a disk having first and second encoded data areas. The second encoded data area uses a different encoding format from the first encoded data area. A track centerline circuit generates a track centerline signal. An adjustment circuit generates a second encoded data area position signal from the track centerline signal and a second encoded data area position reference signal.

In yet another aspect of the invention, computer readable program code precisely controls the lens to read the second encoded data in the second encoded data area.

In this way, the readability of the data encoded in the second encoding format, such as BCA code, is improved by positively controlling the motion of the tracking actuator and the sled.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 2:
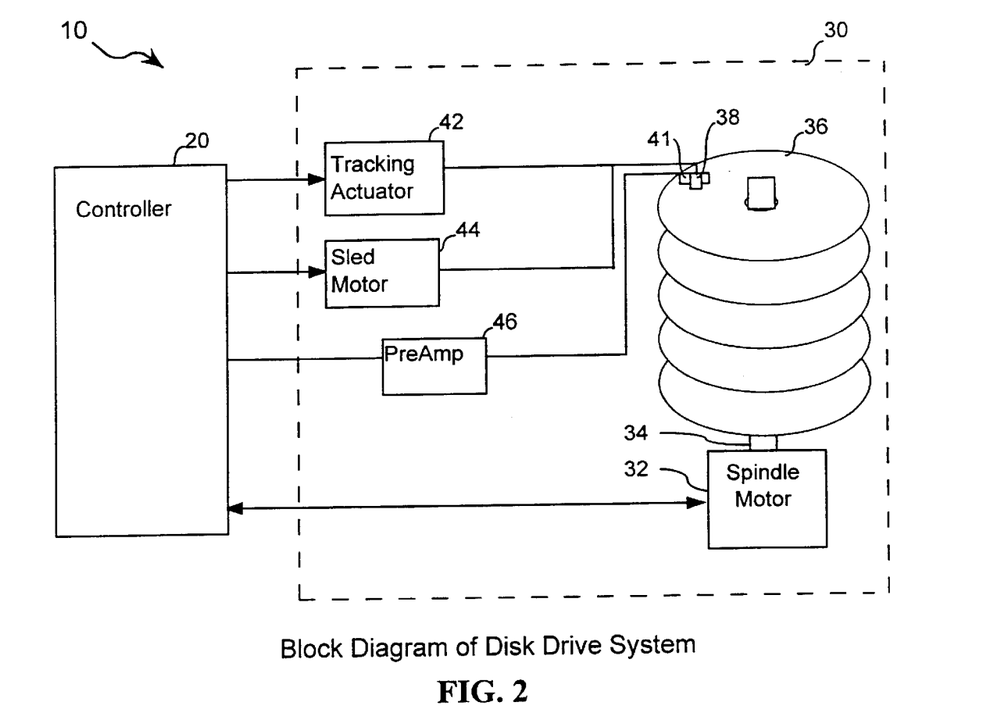
FIG. 2 illustrates a general architecture of a disk drive system in accordance with an embodiment of the present invention.

In FIG. 2, a disk drive system 10 has a controller unit 20 that connects to a disk drive 30 such as an optical disk drive. In the optical disk drive 30, a spindle motor 32 is attached to a spindle 34 which supports at least one disk 36. In response to commands from the controller unit 20, the spindle motor 32 rotates the spindle 34 and therefore the disk 36. While the disk 36 is rotating, an optical head assembly 38 reads information from, or writes information to, the disk 36.

Figure 3:
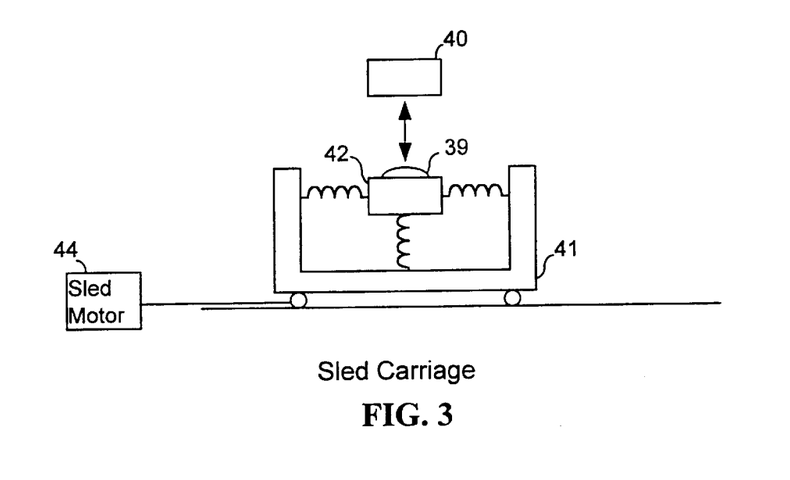
FIG. 3 illustrates a lens mounted in a sled of FIG. 2.

Referring also to FIG. 3, the optical head assembly 38 includes a lens 39 and a photo-sensor 40. The lens 39 directs the reflected light beam to the photo-sensor 40. The head assembly 38 is mounted on a sled 41. A tracking actuator 42 is coupled to the lens 39 and moves the lens 39 within the confines of the sled 41. The tracking actuator 42 may be a voice coil motor. A sled motor 44 moves the sled 41.

Referring back to FIG. 2, the controller 20 controls the sled 41 and the tracking actuator 42 to position the head assembly 38 and lens 39, respectively, with respect to a target track on the disk 36. On rough searches, the sled motor 44 is the prime mover of the optical head assembly 38. On fine searches, the tracking actuator 42 is the prime mover of the lens 39. A rough search is a long search while a fine search is a short search. In one implementation, a rough search is a long search in which the lens 39 position is changed by 300 tracks or more by moving the sled, while a fine search is a short search in which the lens 39 position is changed by less than 300 tracks using the tracking actuator 42.

A preamplifier 46 receives an analog RF signal from the optical head assembly 38 and outputs an analog read channel signal.

Figure 4:
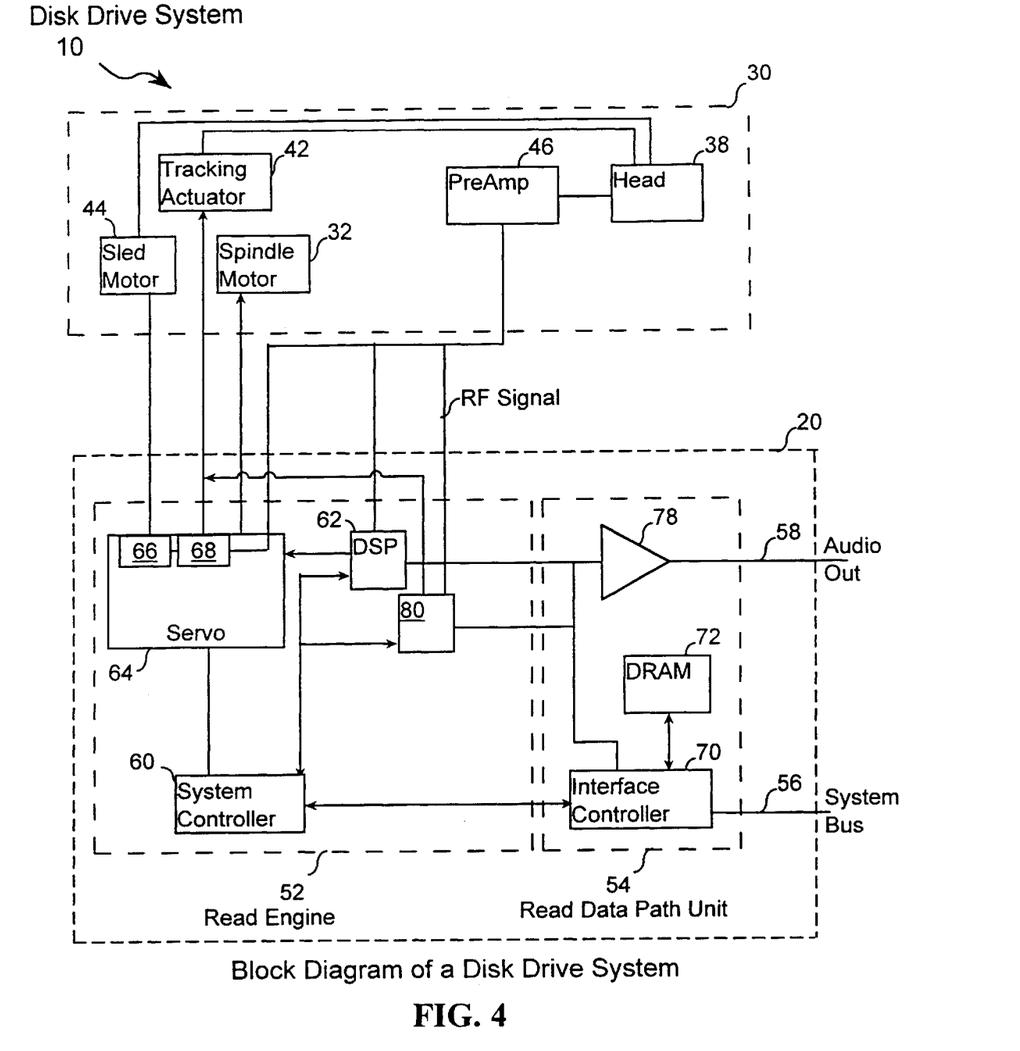
FIG. 4 illustrates a more detailed architecture of a disk controller in accordance with an embodiment of the present invention.

FIG. 4 is a more detailed block diagram of the disk drive system 10 including the disk controller 20 and its associated disk drive 30. The disk controller 20 has a read engine 52 that connects to a read data path unit 54. The read engine 52 communicates directly with the disk drive 30 while the read datapath unit 54 communicates with a system bus 56 and supplies an audio signal to an audio output line 58.

The read engine 52 has a system controller 60, a digital signal processor 62 and a servo control unit 64. The system controller 60 receives commands from and sends status to the system bus 56 via the read datapath unit 54. In response to the commands from the system bus 56, the system controller 60 sends commands to and receives status information from the digital signal processor (DSP) 62 and the servo control unit 64 to read data from or write data to the disk.

The servo control unit 64 positions the lens 39 with respect to a target track, and then keeps the lens 39 centered and focused on the target track based on signals from the lens 39 and the DSP 62. The servo control unit 64 sends signals to the tracking actuator 42, the sled motor 44 and spindle motor 32 to control tracking, disk rotation and focusing. The servo control unit 64 communicates with the sled motor 44 and the tracking actuator 42 to position the optical head assembly 38 and lens 39 precisely with respect to the spiral track to read the desired information from the disk 36. In particular, in the servo control unit 64, a sled motor driver 66 controls the sled motor 42 with a sled motor drive signal; and, an actuator driver 68 controls the tracking actuator 44 with a tracking actuator drive signal.

The DSP 62 receives the analog read channel signal from the preamplifier 46 and outputs a digital read channel signal. The analog read channel signal includes both digital data and control information. The DSP 62 processes the analog read channel signal and outputs control signals that are used by the servo control unit 64. DVD disks use EFM plus encoding and have a basic (1×) clock speed of 26.16 megabits per second with a data rate of 11.08 megabits per second. EFM plus encoding uses eight to sixteen encoding and the minimum and maximum number of adjacent zeroes are two and ten, respectively.

When reading data from the main storage area of the disk, the DSP 62 receives the analog read channel signal and outputs a digital data signal. The interface controller 70 receives the digital data signal from the DSP 62 in a serial stream, descrambles the data, and assembles the data into eight-bit bytes. The interface controller 70 then stores the data in the DRAM 72. The DRAM 72 acts as a buffer for the digital data from the DSP 62. The interface controller 70 also performs error detection and correction operations on the buffered data and transfers the data to the system bus 56.

To provide an audio output, a digital-to-analog converter (DAC) 78 receives the digital data signal from the DSP 62 and outputs an audio signal on the audio output line 58.

In a noteworthy aspect of the invention, when the optical head assembly is positioned over a BCA region of a disk, the circuit 80 of the present invention is used to precisely position the lens with respect to the burst cutting area to read the BCA code by controlling the tracking actuator. The circuit 80 and method of the present invention will be discussed in detail below with reference to FIGS. 7 and 8, respectively.

Figure 5:
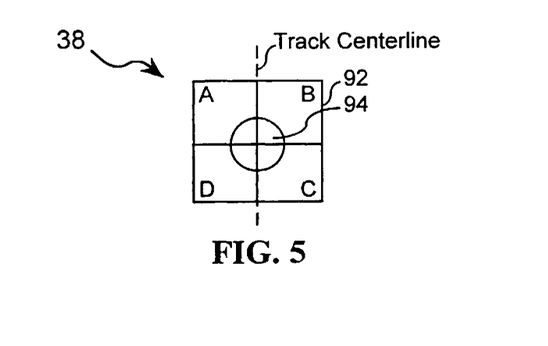
FIG. 5 illustrates a photo-diode mounted on a sled of FIGS. 2 and 3.

In FIG. 5, in the optical head assembly 38, the photo-sensor is a photo-diode 92 with four regions, A, B, C and D. The laser light is reflected from the disk surface onto the surface of the photo-diode 92 as a spot 94. When the lens 39 and therefore the photo-diode 92 are aligned along the centerline of a track, half of the spot 94 will project on regions A and D and half of the spot 94 will project on regions B and C. In other words, regions A and D correspond to one side of the track centerline, while regions B and C correspond to the other side of the track centerline.

Figure 6:
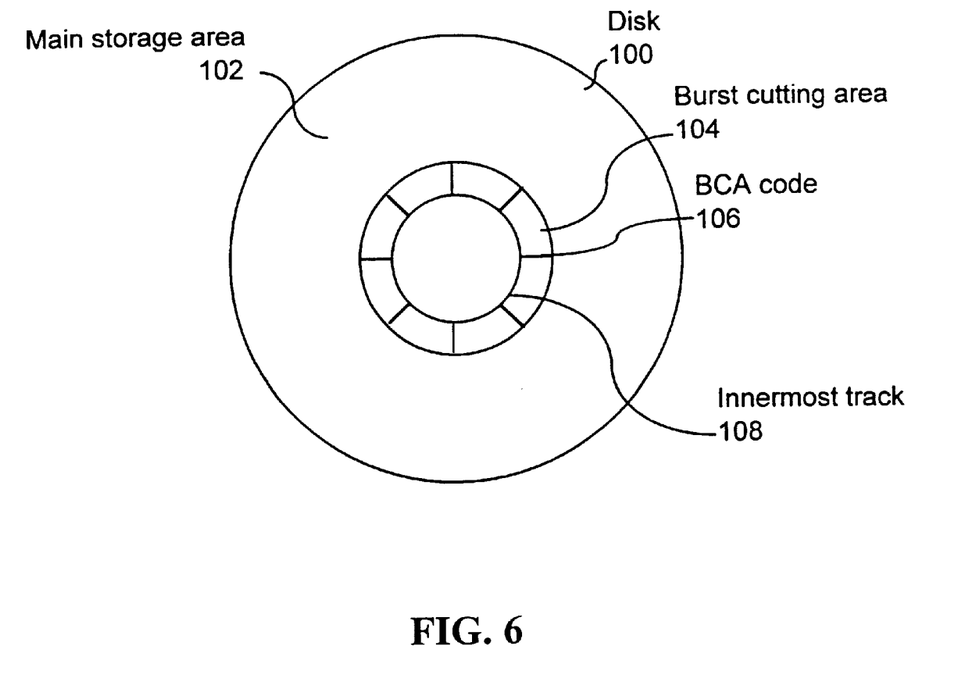
FIG. 6 illustrates a main storage area and a burst cutting area of a disk suitable for use with the present invention.

In FIG. 6, a disk 100 stores data in a main storage area 102 and in a burst cutting area 104. In the main storage area 102, the data stored is stored in a spiral track using EFM encoding. In the burst cutting area 104, BCA code 106 is stored. The BCA code 106 is a bar code. The burst cutting area 104 is in a lead-in region at the innermost track 108 of the disk.

Figure 7:
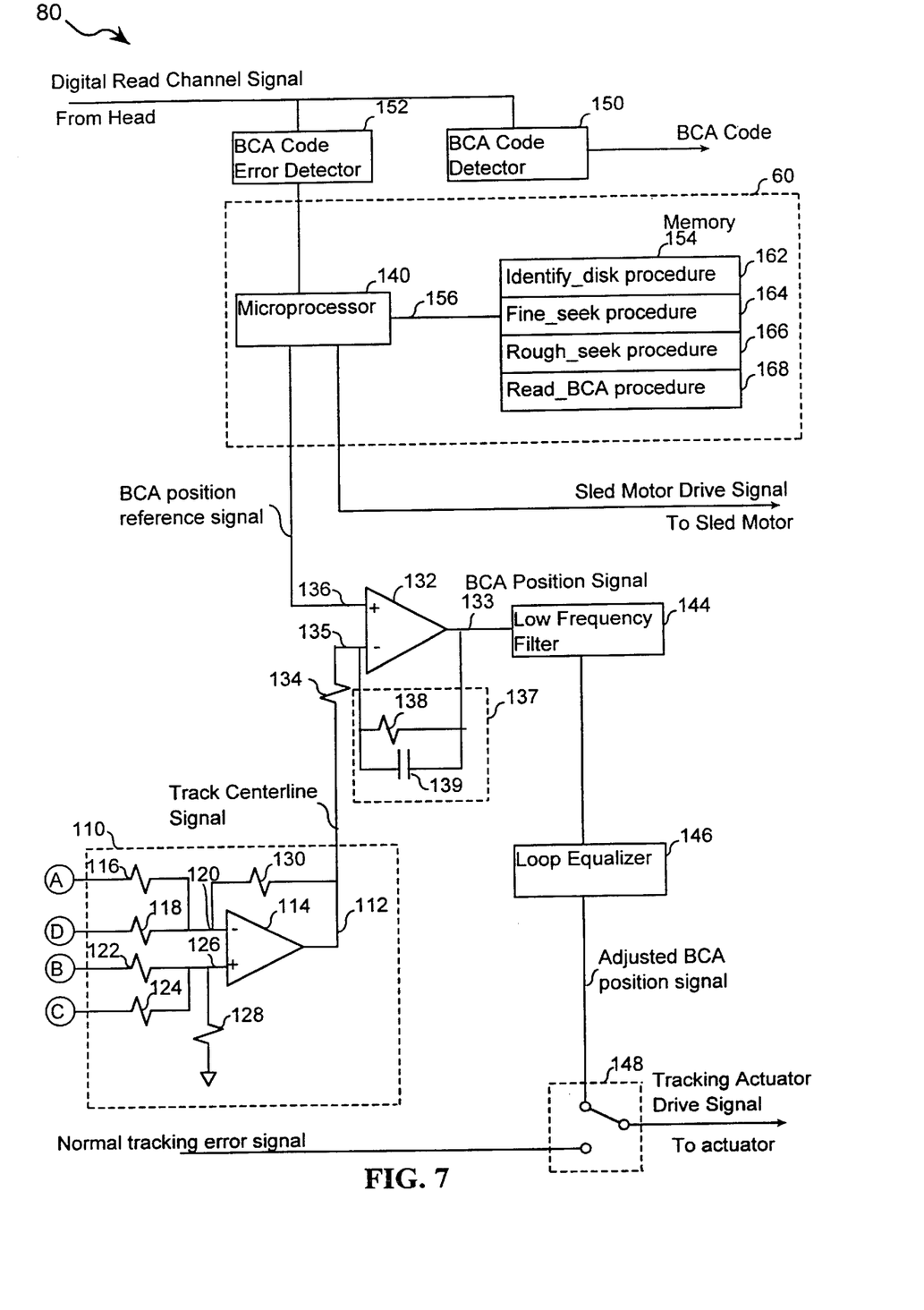
FIG. 7 illustrates a circuit that changes the lens position to read the BCA code in accordance with an embodiment of the present invention.

In FIG. 7, in a noteworthy aspect of the invention, the circuit 80 maintains the lens in a substantially stationary position with respect to the disk when reading the BCA code. When the BCA code has an error, the circuit 80 changes the lens position with respect to the burst cutting area to find a better position from which to read the BCA code. In particular, the circuit 80 modifies the tracking actuator drive signal to change the position of the lens.

The circuit 80 uses the track centerline signal to position the tracking actuator. The track centerline signal is commonly referred to as a push-pull track error signal. The track centerline signal is sometimes used as a center error signal that indicates the relative position of the lens with respect to the sled. In one embodiment, the minimum range of motion of the tracking actuator, and therefore the lens, is ±0.4 mm. with respect to a center position of the lens within the sled.

In FIG. 7, A, B, C and D represent the voltages output by the photo-diode of FIG. 5 in response to the laser beam. A track centerline circuit 110 receives the voltages A, B, C and D and outputs a track centerline signal on line 112 by combining the voltages from each region of the photo-diode in relationship (1) as follows:

$$(B+C)-(A+D) \tag{1}$$

In the track centerline circuit 110, a push-pull differential amplifier 114 receives the voltages corresponding to the portion of the spot projected on each region of the photo-diode, A, B, C and D. The signals from regions A and D are combined via input resistors 116 and 118, respectively, and supplied to a negative input line 120 of the push-pull differential amplifier 114. The signals from regions B and C are combined via input resistors 122 and 124, respectively, and supplied to a positive input line 126 of the push-pull differential amplifier 114. The positive input line 126 is also connected to a reference voltage, in this case ground, via resistor 128. A push-pull feedback resistor 130 provides feedback between the push-pull error signal on a push-pull differential amplifier output line 126 and the negative input line 114. The track centerline signal is also used in the rough search mode in which the sled is the prime mover of the lens. When properly positioned over the burst cutting area, the track centerline signal will be zero.

A BCA offset differential amplifier 132 generates a BCA position signal on line 133. The BCA offset differential amplifier 132 receives the track centerline error signal via resistor 134 and subtracts the track centerline error signal on a negative input line 135 from a BCA position reference signal on a positive input line 136. A BCA feedback filter 137 provides a feedback path from the output of the BCA offset differential amplifier 132 to the input. The BCA feedback filter 137 has a resistor 138 connected in parallel with a capacitor 139.

In the system controller 60, a microprocessor 140 supplies the BCA position reference signal. The microprocessor 140 changes the voltage level of the BCA position reference signal to move the lens to improve the readability of the BCA code in the burst cutting area.

A low frequency filter 144 increases the low frequencies of the BCA position signal to provide sufficient gain to correct for deviations from the ideal circular rotation due to eccentricity at the once-around frequency. The low frequency filter 144 is preferably a lag-lead network. At DVD 1× speed, the once-around frequency is approximately twenty-two Hertz (Hz). A loop equalizer 146 increases stability by compensating for second-order mechanical effects of the tracking actuator in the filtered BCA position signal.

A switch 148 supplies either the equalized-filtered BCA position signal or a normal track error signal as the tracking actuator drive signal to the actuator.

During operation of the circuit 80, initially the BCA position reference signal is chosen such that the tracking actuator positions the lens at a center position with respect to the sled. Because the burst cutting area is wide, the track centerline signal will often be equal to zero. However, if the lens is positioned at an edge of the burst cutting area, the track centerline signal will no longer have a zero value. Therefore, by subtracting the track centerline signal from the BCA position reference signal, the circuit 80 provides a modified tracking actuator drive signal which repositions the lens. In this way, the circuit 80 keeps the lens positioned over the burst cutting area, even at the edges, thereby allowing the BCA code to be read despite runout and wobble.

In the burst cutting area, a digital read channel signal is supplied to a BCA code detector 150 and a BCA code error detector 152. The BCA code detector 150 derives and decodes the BCA code from the digital read channel signal and outputs the decoded BCA code to the DRAM. The BCA code error detector 152 determines whether the digital read channel signal and/or the decoded BCA code has an error.

The microprocessor 140 is coupled to a memory 154 via a system bus 156. The memory 154 stores procedures which are executed by the microprocessor 140 to identify the BCA code. The procedures include:

- an Identify_disk procedure 162 implementing the method described below with reference to FIG. 8;
- a Fine_seek procedure 164 that performs a fine seek by repositioning the lens using the tracking actuator;
- a Rough_seek procedure 166 that performs a rough seek by repositioning the lens using the sled motor; and
- a Read_BCA procedure 168.

Figure 8:
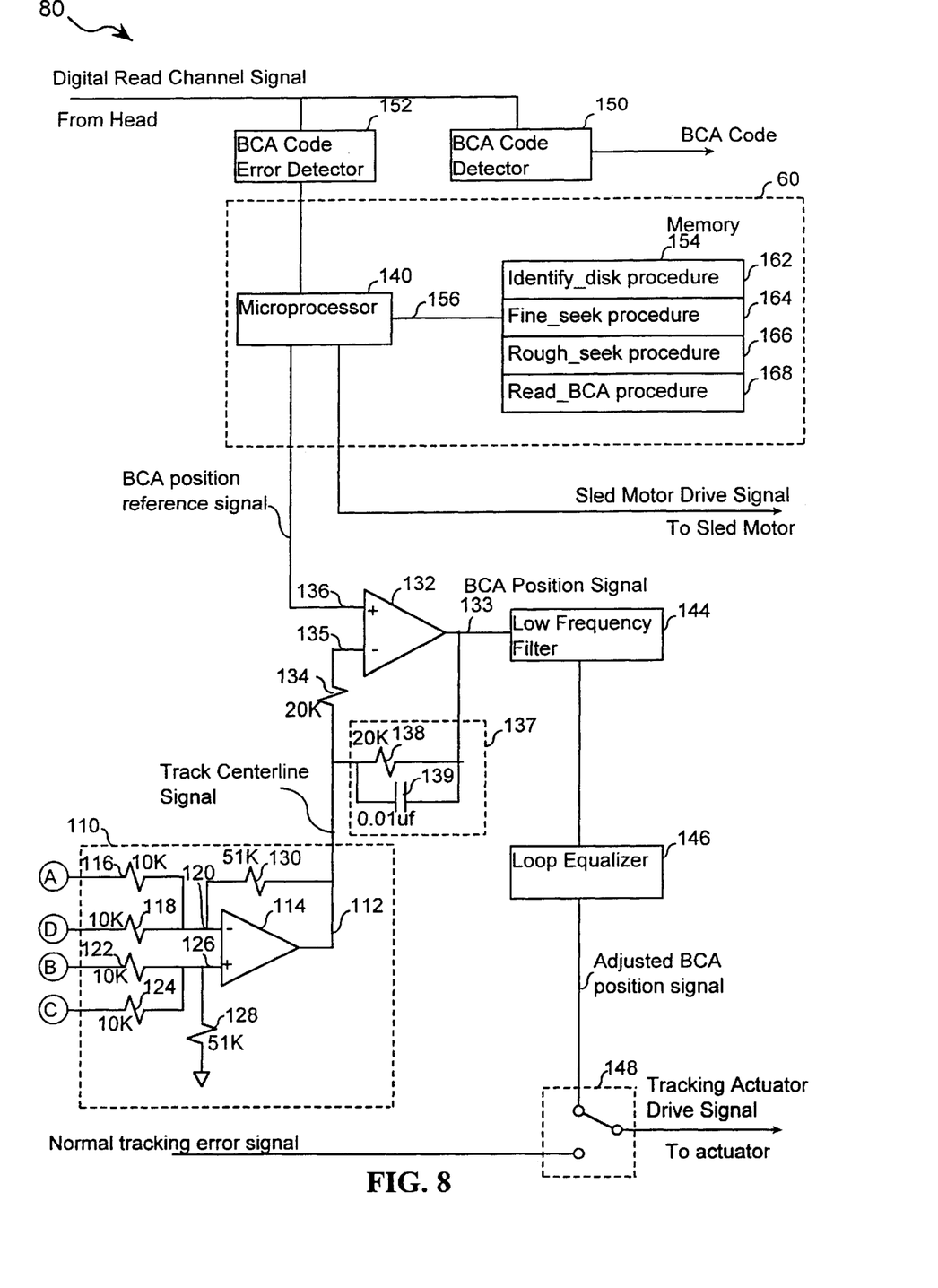
FIG. 8 is one implementation of the circuit of FIG. 7 with exemplary values for the components in accordance with an embodiment of the present invention.
Figure 9:
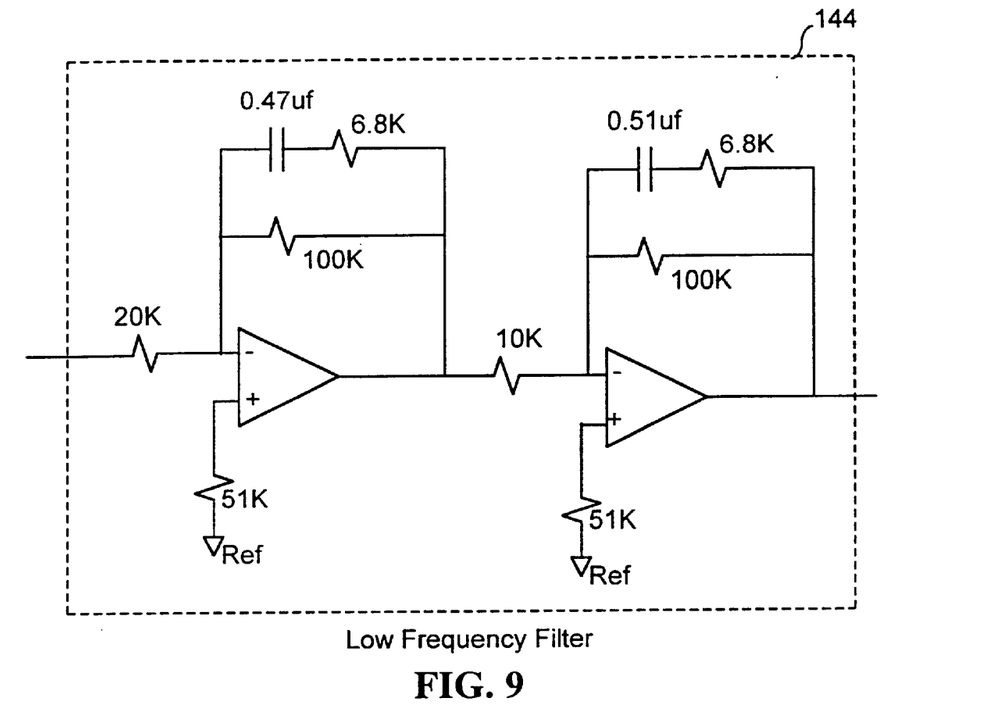
FIG. 9 is a one implementation of a low frequency filter of FIG. 7 in accordance with an embodiment of the present invention.
Figure 10:
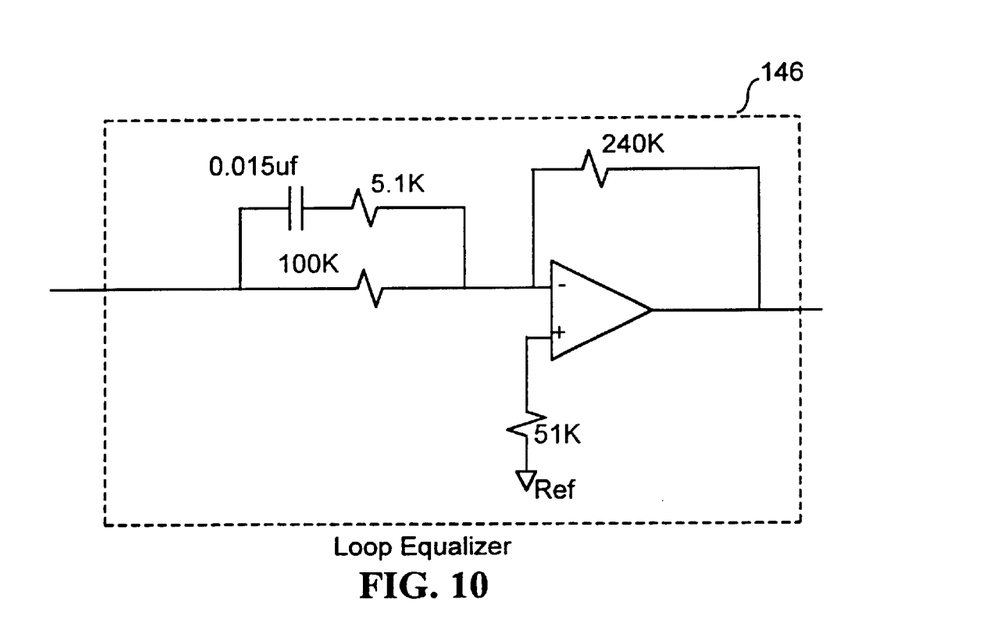
FIG. 10 is a one implementation of a loop equalizer of FIG. 7 in accordance with an embodiment of the present invention.

FIG. 8 is one implementation of the circuit of FIG. 7 with exemplary values for the components. FIG. 9 is one implementation of the low frequency filter 144 of FIG. 7 with exemplary values for the components. FIG. 10 is a one implementation of the loop equalizer 146 of FIG. 7 with exemplary values for the components.

Figure 11:
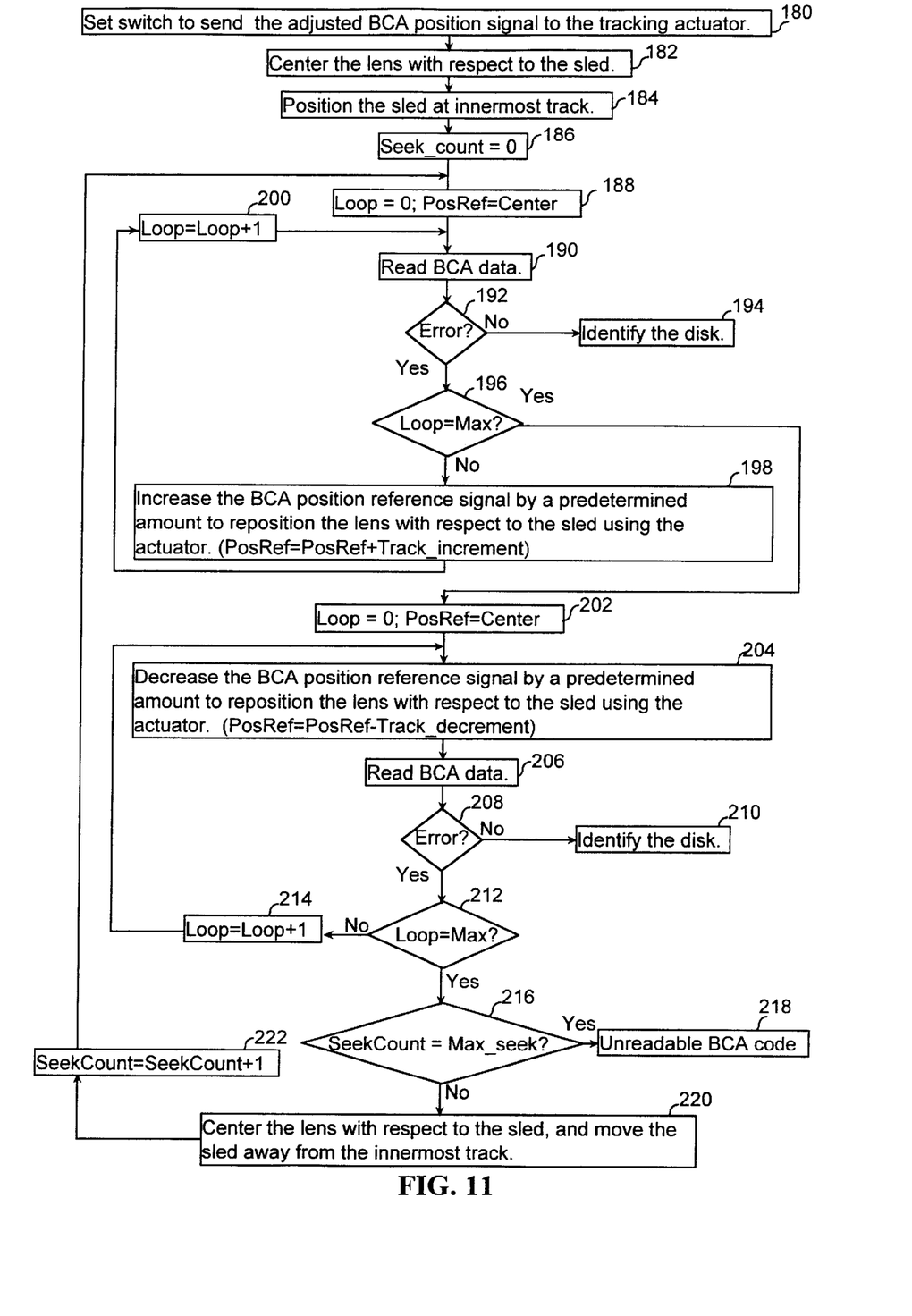
FIG. 11 is a flowchart of a method of changing the lens position in the burst cutting area using the circuit of FIG. 7 in accordance with an embodiment of the present invention.

Another noteworthy aspect of the invention is shown in the flowchart of FIG. 11. The flowchart illustrates a method of reading the BCA code implemented by the Identify_disk procedure 162 of FIG. 7. The microprocessor (140, FIG. 7) executes the Identify_disk procedure to read the BCA code from the burst cutting area. The Identify_disk procedure invokes the other procedures stored in the memory to perform certain operations.

In this method, when the BCA code generates read errors that have not been corrected by applying the track centerline signal to the BCA position reference signal, the Identify_disk procedure changes the position of the lens. The read errors may be caused by poor positioning of the lens in the burst cutting area or defects of the BCA code in the burst cutting area.

In general, the method performs a rough seek to the burst cutting area, and attempts to read the BCA code. When the BCA code cannot be read, a sequence of fine positioning steps repositions the lens using a fine seek operation and re-reads the BCA code. When the fine positioning steps fail to read the BCA code, the lens is again repositioned using a rough seek operation and the sequence of fine positioning and re-reading repeats.

In step 180, the switch 148 of FIG. 7 is configured to supply the adjusted BCA position signal to the tracking actuator. In step 182, the lens is centered with respect to the sled by supplying a BCA position reference signal with a "centering" voltage using the Fine_seek procedure (164, FIG. 7). In step 184, a rough seek is performed to position the sled at the innermost track of the disk using the Rough_seek procedure (166, FIG. 7). In step 186, a seek counter (Seek_count) is set to zero. The seek counter will be used to limit the number of rough seeks that are performed to reposition the lens before determining that the BCA code is not readable.

In step 188, a loop counter (Loop) is initialized to zero; and a tracking actuator position value (PosRef) is initialized to a value that places the lens in the center of the sled. In step 190, the BCA code is read using the Read_BCA procedure (168, FIG. 7). In step 192, if no error is detected in the BCA code, the disk is identified (step 194) and the process ends.

If an error is detected in the BCA code, in step 196, the loop counter (Loop) is compared to a maximum value (Max). If the loop counter is less than the maximum value, in step 198, the BCA position reference signal (PosRef) is increased by a first predetermined amount (Track_increment) and supplied to the tracking actuator using the Fine_seek procedure to radially reposition the lens in a first direction with respect to the sled. Step 200 increments the loop counter and proceeds to step 190.

In step 196, when the loop counter (Loop) equals the maximum value (Max), a sequence of steps repositions the lens in an opposite direction from the first direction. In step 202, the loop counter (Loop) is set to zero; and the BCA position reference signal (PosRef) is set to the center value. In step 204, the BCA position reference signal (PosRef) is decreased by a second predetermined amount (Track_decrement) and supplied to the tracking actuator using the Fine_seek procedure to radially reposition the lens, with respect to the sled, in a second direction opposite the first direction.

In step 206, the BCA code is read using the Read_BCA procedure (168, FIG. 7). In step 208, if no error is detected in the BCA code, the disk is identified (step 210) and the process ends.

If an error is detected in the BCA code, in step 212, the loop counter (Loop) is compared to the maximum value (Max). If the loop counter is less than the maximum value, step 214 increments the loop counter and proceeds to step 204.

If the loop counter (Loop) equals the maximum value (Max), a seek may be performed. Step 216 determines if the seek counter (SeekCount) is equal to a maximum value (Max_seek). If so, step 218 determines that the BCA code is not readable and the process ends.

If the seek counter (SeekCount) is less than the maximum value (Max_seek), in step 220, a fine seek is performed to center the lens with respect to the sled, and a rough search is performed to move the sled away from the innermost track by a predetermined number of tracks. In one embodiment, the predetermined number of tracks is equal to one. Step 222 increments the seek counter (SeekCount) and proceeds to step 188.

Using this method, the position of the lens is precisely controlled and the readability of the BCA code in the burst cutting area is improved. In this way, by precisely repositioning the lens using the tracking actuator, a method and apparatus improve the readability of the BCA code in the burst cutting area.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of positioning an optical head assembly for reading a disk, the optical head assembly including a tracking actuator mounted on a sled, the optical head assembly including a lens coupled to the tracking actuator, the disk having a first data area and a second data area, the second data area using a different encoding format from the first data area, the method comprising:

when reading data in the first data area, driving the tracking actuator in accordance with a tracking signal that is independent of data stored in the first data area; and when reading data in a second data area, driving the tracking actuator in accordance with a data error signal, wherein the data error signal has an error value when the optical head assembly is positioned outside the second data area.

2. The method of claim 1 wherein driving the tracking actuator in accordance with a data error signal comprises:

adjusting a position reference signal when the data error signal has an error value;

generating a position signal from the position reference signal and a track centerline signal; and driving the tracking actuator with the position signal so as to change the position of the lens.

3. The method of claim 2 wherein the adjusting includes:

reading a first data error signal;

when the first data error signal has an error value, increasing the position reference signal to change the position of the lens in a first direction;

reading a second data error signal after the increasing;

when the second data error signal has an error value, decreasing the position reference signal to change the position of the lens in a second direction, the second direction being different from the first direction.

4. The method of claim 3 further including:

when the data error signal has an error value after the increasing and decreasing, repositioning the sled over the second data area; and when the data error signal has an error value after the repositioning, repeating the increasing and decreasing.

5. The method of claim 3 wherein the increasing and decreasing are repeated a predetermined number of times before repositioning the sled.

6. The method of claim 4 further including:

repeating the increasing, decreasing and repositioning until the data error signal has no error value; and identifying a disk type from the data signal obtained from the second data area.

7. The method of claim 1 wherein the second data area is a burst cutting area.

8. The method of claim 1 wherein the data in the second data area is a BCA code.

9. A disk drive system for reading information from a disk, the disk having a first data area and a second data area, the second data area using a different encoding format from the first data area, the system comprising:

a disk drive having an optical head assembly, the optical head assembly including a tracking actuator mounted on a sled, the optical head assembly including a lens coupled to the tracking actuator; and a disk controller for controlling the disk drive, the disk controller including a driving circuit for driving the tracking actuator, wherein the driving circuit is configured, when reading data in the first data area, to drive the tracking actuator in accordance with a tracking signal that is independent of data stored in the first data area; and the driving circuit is configured, when reading data in a second data area, to drive the tracking actuator in accordance with a data error signal, wherein the data error signal has an error value when the optical head assembly is positioned outside the second data area.

10. The system of claim 9 wherein when reading data from the second data area, the driving circuit:

adjusts a position reference signal when the data error signal has an error value;

generates a position signal from the position reference signal and a track centerline signal; and drives the tracking actuator with the position signal so as to change the position of the lens.

11. The system of claim 10 wherein the driving circuit adjusts the position reference signal by:

reading a first data error signal;

when the first data error signal has an error value, increasing the position reference signal to change the position of the lens in a first direction;

reading a second data error signal after the increasing;

when the second data error signal has an error value, decreasing the position reference signal to change the position of the lens in a second direction, the second direction being different from the first direction.

12. The system of claim 11 wherein when the data error signal has an error value after the increasing and decreasing, the driving circuit repositions the sled over the second data area; and when the data error signal has an error value after the repositioning, the driving circuit repeats the increasing and decreasing.

13. The system of claim 11 wherein the driving circuit increases and decreases the position reference signal a predetermined number of times before repositioning the sled.

14. The system of claim 12 wherein the circuit further repeats the increasing, decreasing and repositioning until the data error signal has no error value.

15. The system of claim 9 wherein the second data area is a burst cutting area.

16. The system of claim 9 wherein the data in the second data area is a BCA code.

* * * * *